United States Patent [19]

Amiand et al.

[11] Patent Number: 5,043,953

[45] Date of Patent: Aug. 27, 1991

[54] PRESSURE COMPENSATION DEVICE FOR AN IMMERSED VOLUME OF GAS, IN PARTICULAR FOR AN UNDERWATER ELECTROACOUSTIC TRANSDUCER

[75] Inventors: Vincent Amiand, Angouleme; Yves Chauvin, Charente, both of France

[73] Assignee: Etat Francais represente par le Delegue General Ministeriel pour l'Armement, Paris, France

[21] Appl. No.: 567,088

[22] Filed: Aug. 14, 1990

[30] Foreign Application Priority Data

Aug. 31, 1989 [FR] France .............................. 89 11416

[51] Int. Cl.⁵ .......................................... H04R 17/00
[52] U.S. Cl. .................................... 367/167; 367/172; 310/337
[58] Field of Search ................. 367/167, 172; 310/337; 138/30

[56] References Cited

U.S. PATENT DOCUMENTS 4,951,698  8/1990  Grosso ............................ 367/167

Primary Examiner—Deborah L. Kyle
Assistant Examiner—J. Woodrow Eldred
Attorney, Agent, or Firm—Oliff & Berridge

[57] ABSTRACT

This pressure compensating device for a volume of immersed gas is equipped with mobile or deformable walls and includes an immersed compensation bladder. The bladder is secured in a housing and communicates with the volume to be compensated. It is arranged by mounting means roughly at the level of the volume. According to the invention, the housing mounting means for the compensation bladder are arranged to allow the housing to move vertically relative to the gas volume so as to keep the mean front of the bladder folds at the level of the surfaces to be compensated, as the volume may be immersed to different depths.

The housing mounting means include an arm hinged about a horizontal axis, and a spring exerting its force on a cable connected to the hinged arm.

Depending on the preferred application, the mobile walls enclosing volume to be compensated consist of the acoustic drives of underwater electroacoustic transducers.

14 Claims, 2 Drawing Sheets 5,043,953

PRESSURE COMPENSATION DEVICE FOR AN IMMERSED VOLUME OF GAS, IN PARTICULAR FOR AN UNDERWATER ELECTROACOUSTIC TRANSDUCER

BACKGROUND OF THE INVENTION

TECHNICAL FIELD OF THE INVENTION

This invention relates to a device for compensating the pressures inside and outside of an immersed volume of gas, and chiefly of air. It is equipped with mobile or deformable walls whose positions are not to be affected by the depth variations of the volume.

A typical example of application comprises of underwater electroacoustic transducers used for sweeping acoustic mines.

The pressures inside and outside of the diaphragms forming the drives of these electroacoustic transducers must be kept equal in order for them to operate correctly. This is done by mounting a flexible compensation bladder in a housing on the rear of the minesweeping vehicle, with the bladder in communication with the volume to be balanced. The housing mounting means positions the housing at the general level of the volume to be compensated.

The principle of the pressure compensation device is as follows. Any variation in the depth at which the vehicle is navigating varies the hydrostatic pressure applied to the diaphragms of the electroacoustic transducers, and simultaneously compresses or expands the compensation bladder until the internal and external pressures of this volume are equalized. This compensation is performed independently and automatically, and therefore seems to be satisfactory; but it does suffer from one limitation, in that it allows a nominal navigation depth of only about 8 m, with possible 4 m variations above and below this nominal depth.

SUMMARY OF THE INVENTION

The purpose of the invention is to propose an immersed volume compensating device compatible with deep immersions and large variations above and below the nominal immersion depth. As an example, a nominal immersion depth of about 60 m is considered, with variations of 30 m above or below that depth.

It is not enough to simply adapt the technique that exists already for shallow depths, because the great differences in immersion depth correspond to large variations in hydrostatic pressure and hence require relatively large bladder volume variations. Yet a flexible bladder of large capacity first deforms, when immersed, in its lower part where the hydrostatic pressure is highest. This lower part will then move with respect to the fixed housing and therefore to the volume, so that there will be a variable difference in height between the mean level of this lower part and the fixed mean level (with respect to the compensated volume) of the moving walls to be compensated. This will cause a difference in the variable internal and external pressures at the level of the walls to be compensated, so that the equal pressure desired will not be achieved.

This difficulty is solved in accordance with the invention by the fact that the housing mounting means securing the bladder is arranged to allow the housing to move vertically relative to the volume of gas, so as to keep the mean front of the bladder folds at the level of the walls to be compensated as the volume of gas is immersed more or less deeply.

Advantageously, the housing mounting means includes a guiding means along at least one vertical component, and one elastic recall means. The former advantageously includes an arm, integral with the housing and hinged about a horizontal axis, while the latter means includes a spring exerting its force on a cable connected to the hinged arm, preferably through a sector integral with the arm and about which the cable bends partially.

It is advantageous to provide two housings, one on each side of the volume to be compensated.

The preferred application of the invention is the compensation of the acoustic drives of underwater electroacoustic transducers.

BRIEF DESCRIPTION OF THE DRAWINGS

The aforementioned aspects and other features of the invention are presented in the following description, taken in conjunction with the accompanying drawings, wherein.

DETAILED DESCRIPTION OF PREFERRED EMBODIMENTS

The immersed volume of air 1 is watertight and includes one mobile wall that remains unaffected by any variations in depth above or below a nominal depth of immersion. Such a mobile wall may consist of the diaphragm of an underwater electroacoustic transducer.

The horizontal axis of the wall to be compensated is designated by 0 and the horizontal plane containing this axis by H.

Figure 2:
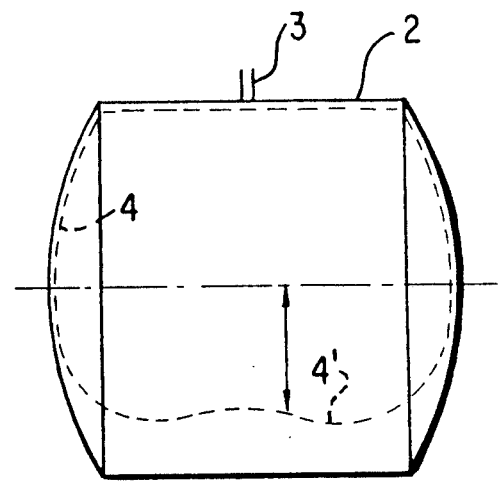
FIG. 2 is a lateral view of a housing and its internal compensation bladder.
Figure 3:
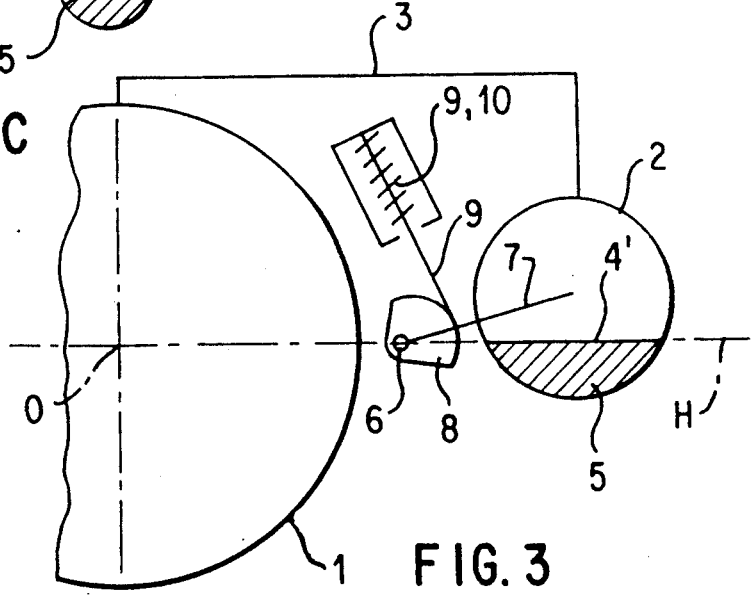
FIG. 3 is a schematic view showing the mounting means of a housing and its compensation bladder next to the volume to be compensated.

To either side of the volume 1, two mobile housings 2 are provided containing a flexible bladder 4 (FIG. 2) whose internal volume is connected by a flexible communication, diagrammed in FIG. 3, to the inside of the air volume 1.

The housings 2 include orifices, not shown, in their walls that communicate with the outside medium, i.e. with the environing water, in such a way that the bladders 4 they contain are subjected to the ambient hydrostatic pressure. As the hydrostatic pressure exerted on the bottom of the bladder 4 is greater than that exerted on the top, the bladder 4, subjected to a pressure that increases with the depth of immersion, will contract from bottom to top and, in so doing, will form folds 4' defining a roughly horizontal front.

Figure 1A:
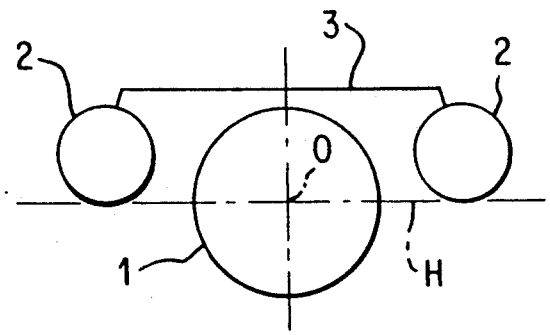
FIGS. 1A, 1B, 1C are three schematic views of a volume equipped with two compensation bladder housings that are mobile with respect to the volume, shown at three stages of immersion.
Figure 1B:
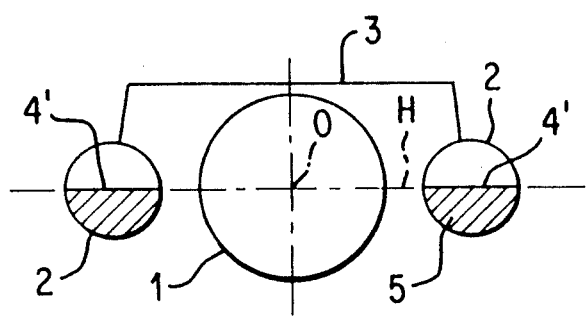
Figure 1C:
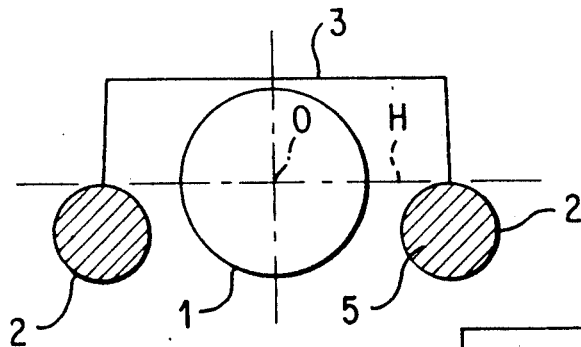

According to the principle of the invention, illustrated very schematically in FIGS. 1A, 1B and 1C, the mounting means of housings 2 with respect to the volume 1 are such that the mean lower front 4' of the bladder 4 is always located roughly in the plane H containing the axis 0 of the mobile walls of volume 1 to be compensated, and remains so through a range of variation of immersion depth to either side of the nominal immersion depth of volume 1.

To do so, it is best, as FIGS. 1A and 1C show, that the housings be mobile between:

a high position (FIG. 1A) where the bladders are not contracted in the housings 2, i.e. the low point of the housings 2 is roughly tangent to the plane H;

and a low position (FIG. 1C) where the bladders are completely compressed (or nearly so) in the housings 2, which are then filled with water 5, and are roughly tangent to the plane H at the level of their upper part.

Between these two extreme positions exist intermediate positions such as those of FIG. 1B, where the bladders are partly contracted in the housings 2, still in such a way that the mean front of the folds 4' of the bladder are roughly in the plane H.

Under these conditions, it is understood that, in conformity with the invention, the air pressure in the compensation bladders 4 is always equal to the hydrostatic pressure at the level of the plane H, and that therefore the compensating pressure offered by the said bladders to the internal volume 1 is precisely the pressure that exists outside the mobile walls of the volume, so that these walls are perfectly balanced and do not move despite the variations in immersion depth.

The mobile mounting means of housings 2 on volume 1 can be constructed in various forms.

It is therefore possible to design the housings 2 to be mounted mobile in vertical translation, and supported by a spring action device.

However, in a preferred embodiment (FIG. 3), each housing 2 is mounted on a system of hinges 6 of horizontal axis, by arm 7.

A circular reversing sector 8 linked to the arm 7 of the housing 2 is centered on the hinge 6 and receives one end of a cable 9 in a groove running around its circular edge. The other end of the cable is connected to a recall spring 10, itself integral with a fixed point on the chassis.

As the system to be compensated is lowered in the water, the bladder 4 contracts and the buoyancy exerted upon it therefore decreases. Its apparent weight in the water increases and the torque applied to the arm 7 (tending to pivot the housing clockwise) increases.

This torque is centered by the recall moment applied to the arm 7 by the spring 10, which gradually compresses, ensuring the proper descent of the housing 2, while holding it.

When the system to be compensated rises, the reverse operation takes place.

It is possible to provide high and low stops to limit the possible displacements of the housing.

Also, to modulate the recall countertorque applied by cable 9, a reversing sector 8 can be provided that is not of circular pitch but of variable radius, and/or a recall spring 10 of variable stiffness.

Figure 4:
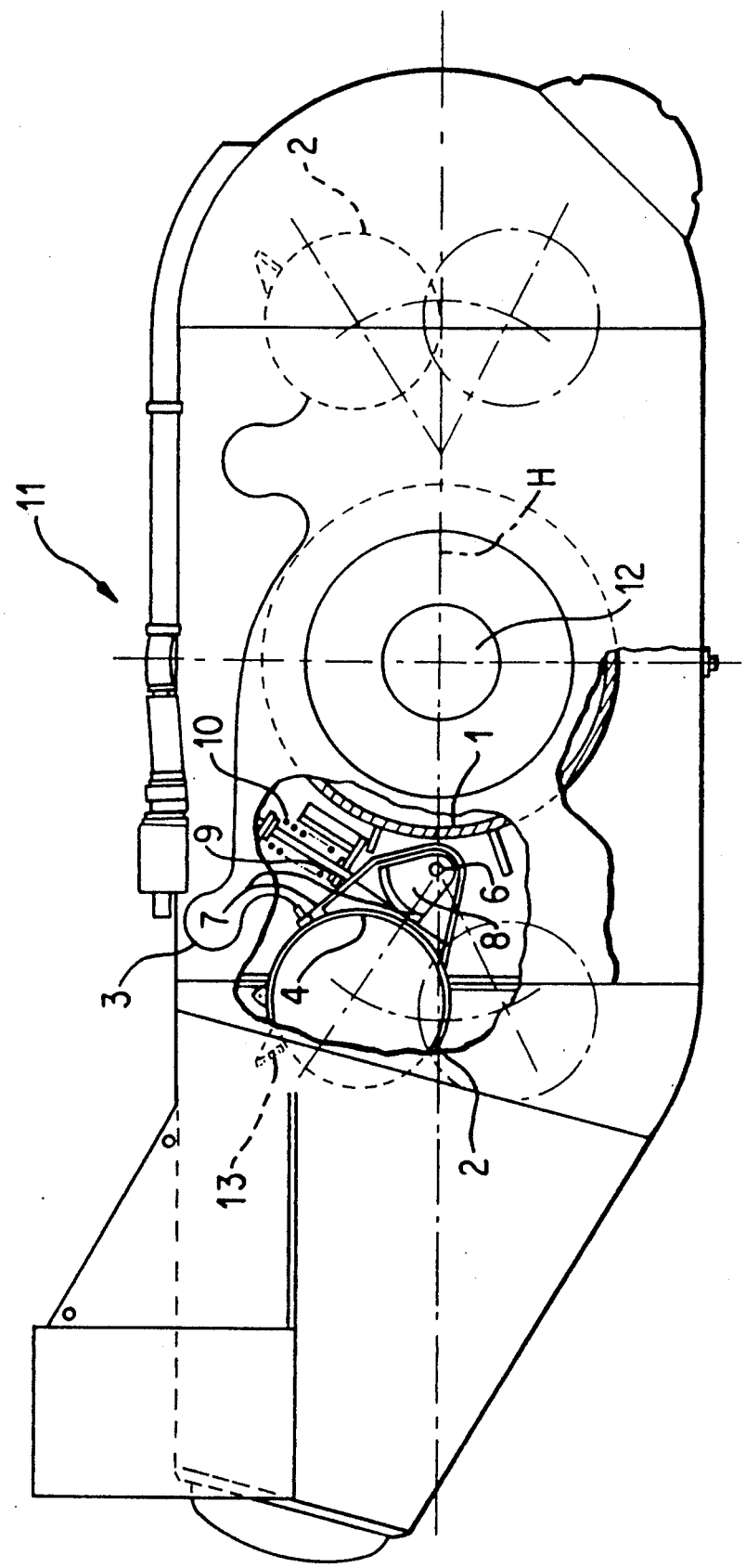
FIG. 4 shows the installation of the device of the invention in an underwater vehicle for hunting acoustic mines.

FIG. 4 illustrates the layout of the device in conformity with the invention, in an underwater vehicle 11 for hunting acoustical mines.

It is known that such a vehicle is designed to affect the acoustic activation devices of the mines, for the purpose of destroying them by exploding them. It constitutes the sound emitter of the minesweeping system, and can be towed at a distance (e.g. of 450 m) behind the carrier vessel, or can navigate independently.

The volume 1 includes the emittor, mainly consisting of a dual electroacoustic transducer. The acoustic drives are two hemispherical diaphragms 12 arranged laterally and moving in phase opposition. These diaphragms are sealed by deformable rubber circular joints.

The vehicle 11 includes two housings 2 of about 80 liters fore and aft of the volume 1. Each housing consists of an elongated cylinder with rounded base walls, held around two generatrices by two dual arms 7, mounted pivotably on a hinge shaft 6 (or two half-shafts) provided in a yoke integral with the vehicle chassis 12. An integral sector 8 is mounted against the inside of one of the dual arms 7. One end of a cable 9 is fastened to the sector 8 and its other end to a spring fastened to the vehicle chassis 12.

The bladders 4 of the two housings 2 communicate with each other through a flexible link 3, itself connected, in a way not shown, to the inside of volume 1.

The housings 2 include a rectangular antipitching flap 13 fastened on a generatrix, to damp the rapid parasitic oscillatory motions of the housing by setting up a viscous resistive torque due to the drag of this flap in the water.

FIG. 4 shows the housings 2 in upper position, and a sketch 2' of the housings in lower position.

These positions correspond to a depth of between 35 m and 90 m, approximately.

What is claimed is:

1. Pressure compensating device for a volume of gas for immersion in an ambient fluid, said device being equipped with mobile walls, which device includes an immersed flexible compensation bladder held in a housing and communicating with the said volume, said compensation bladder being arranged adjacent to the volume by mounting means, wherein the mounting means of the compensation bladder housing is arranged to allow the housing to move in relative vertical translation with respect to the gas volume, said compensation bladder developing folds in a mean front portion thereof when the bladder is subjected to increased pressure, said mounting means keeping the mean front of the folds of the bladder at the level of the walls to be compensated when the volume is raised or lowered in immersion depth.

2. The device of claim 1, wherein the housing mounting means includes guidance means along at least a vertical component, and an elastic recall means connected to the guidance means.

3. The device of claim 2, wherein the housing mounting means includes an arm hinged about a horizontal shaft.

4. The device of claim 3, wherein the recall means includes a spring exerting its force on a cable connected to the hinged arm.

5. The device of claim 4, wherein the cable is connected to the hinged arm by a sector integral with the arm, and said cable bends around the arm.

6. The device of claim 1, wherein two housings are located at either side of the volume to be compensated.

7. The device of claim 1, wherein the volume to be compensated has acoustic drives of electroacoustic transducers as the mobile walls.

8. Pressure compensating device for a volume of gas for immersion in an ambient fluid, said device being equipped with deformable walls, which device includes an immersed flexible compensation bladder held in a housing and communicating with the said volume, said compensation bladder being arranged adjacent to the volume by mounting means, wherein the mounting means of the compensation bladder housing is arranged to allow the housing to move in relative vertical translation with respect to the gas volume, said compensation bladder developing folds in a mean front portion thereof when the bladder is subjected to increased pressure, said mounting means keeping the mean front of the folds of the bladder at the level of the walls to be compensated when the volume is raised or lowered in immersion depth.

9. The device of claim 8, wherein the housing mounting means includes guidance means along at least a vertical component, and an elastic recall means connected to the guidance means.

10. The device of claim 9, wherein the housing mounting means includes an arm hinged about a horizontal shaft.

11. The device of claim 10, wherein the recall means includes a spring exerting its force on a cable connected to the hinged arm.

12. The device of claim 11, wherein the cable is connected to the hinged arm by a sector integral with the arm, and said cable bends around the arm.

13. The device of claim 8, wherein two housings are located at either side of the volume to be compensated.

14. The device of claim 8, wherein the volume to be compensated has acoustic drives of electroacoustic transducers as the deformable walls.

* * * * *